United States Patent
Danville et al.

(10) Patent No.: US 10,539,309 B2
(45) Date of Patent: Jan. 21, 2020

(54) LOW VOLTAGE LED UNDER CABINET LIGHT BAR

(71) Applicant: AMAX INCORPORATED, East Greenwich, RI (US)

(72) Inventors: Dennis Danville, Chepachet, RI (US); Brian Thomas Barrett, Dongguan (CN); Gary Blanchette, Saunderstown, RI (US)

(73) Assignee: AMAX INCORPORATED, North Kingstown, RI (US)

( * ) Notice: Subject to any disclaimer, the term of this patent is extended or adjusted under 35 U.S.C. 154(b) by 0 days.

(21) Appl. No.: 16/198,586

(22) Filed: Nov. 21, 2018

(65) Prior Publication Data
US 2019/0154241 A1 May 23, 2019

Related U.S. Application Data

(60) Provisional application No. 62/590,264, filed on Nov. 22, 2017.

(51) Int. Cl.
| | |
|---|---|
| *F21V 21/00* | (2006.01) |
| *F21V 23/00* | (2015.01) |
| *F21V 23/06* | (2006.01) |
| *F21S 4/28* | (2016.01) |
| *F21V 23/04* | (2006.01) |
| *F21V 33/00* | (2006.01) |
| *F21Y 103/10* | (2016.01) |
| *F21Y 115/10* | (2016.01) |

(Continued)

(52) U.S. Cl.
CPC ............. *F21V 23/001* (2013.01); *F21S 4/28* (2016.01); *F21V 23/008* (2013.01); *F21V 23/04* (2013.01); *F21V 23/06* (2013.01); *F21V 33/0012* (2013.01); *F21W 2131/301* (2013.01); *F21Y 2103/10* (2016.08); *F21Y 2113/13* (2016.08); *F21Y 2115/10* (2016.08)

(58) Field of Classification Search
CPC ...... F21V 23/001; F21V 23/008; F21V 23/04; F21V 23/06; F21V 33/0012; F21S 4/28; F21W 2131/301
USPC ............ 362/222, 219, 221, 223, 225, 217.1, 362/217.01
See application file for complete search history.

(56) References Cited

U.S. PATENT DOCUMENTS 6,283,612 B1 * 9/2001 Hunter .................. F21V 15/015
  362/217.05
8,138,690 B2   3/2012 Chemel
(Continued)

FOREIGN PATENT DOCUMENTS

DE   102013101830 B4   12/2017

*Primary Examiner* — Laura K Tso
(74) *Attorney, Agent, or Firm* — Paul Y. Feng; One LLP

(57) ABSTRACT

An undercabinet light kit using LED lighting and low voltage DC electricals is disclosed. The kit is supplied with a plurality of LED light bars containing LEDs emitting a preselected CCT color temperature. The kit includes a digital control box for system on/off, IR motion detection, and auto shutoff timing. The kit further includes a spool of three-wire electrical cabling that is cut by the end user into cable segments having custom lengths, then used to wire the plurality of light bars and the control box in series. The cable segments are press-fitted into the light bars and control box for an electrical connection without need for special tools or skill.

20 Claims, 6 Drawing Sheets

(51) Int. Cl.
*F21W 131/301* (2006.01)
*F21Y 113/13* (2016.01)

(56) References Cited

U.S. PATENT DOCUMENTS

| | | | | |
|---|---|---|---|---|
| 8,888,306 | B2* | 11/2014 | Thomas | F21V 15/013 |
| | | | | 362/92 |
| 9,004,717 | B2* | 4/2015 | Ratkus | F21V 15/013 |
| | | | | 362/222 |
| 2002/0172037 | A1* | 11/2002 | Schnaufer | F21L 14/026 |
| | | | | 362/221 |
| 2005/0007031 | A1* | 1/2005 | Hyder | F21S 2/005 |
| | | | | 315/276 |
| 2012/0314407 | A1* | 12/2012 | Souvay | F21V 5/002 |
| | | | | 362/191 |
| 2013/0215609 | A1* | 8/2013 | Liu | F21K 9/278 |
| | | | | 362/223 |
| 2014/0334142 | A1* | 11/2014 | Levante | F21V 23/06 |
| | | | | 362/222 |

* cited by examiner

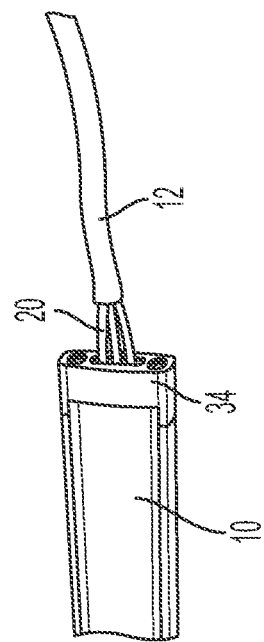
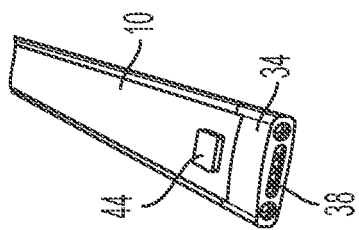
FIG. 4(a)
FIG. 4(b)

LOW VOLTAGE LED UNDER CABINET LIGHT BAR

CROSS-REFERENCE TO RELATED APPLICATIONS

This non-provisional application claims benefit of priority from U.S. provisional application No. 62/590,264, filed on Nov. 22, 2017, the contents of which are hereby incorporated by reference.

FIELD OF THE INVENTION

The present invention is directed to an undercabinet or like task light bar.

BACKGROUND

Conventional light bars or task lights have an elongated housing containing a light source such as a fluorescent tube. The back of the light bar has mounting hardware for installation to an overhanging cabinet or overarching surface above the work area to be illuminated. Power for the light bar is supplied by a 120V/220V AC cable of a fixed, factory set length, usually 12 or 24 inches, extending out from one end of the housing. The AC cable terminates with a three-prong plug that inserts into a standard AC outlet.

There are task and undercabinet LED light bars commonly used to illuminate computer workstations. This category of light bars uses low voltage usually 12V or 24 VDC. The power source from the wall outlet is fed through a transformer including an AC-to-DC rectifier "brick" that has a cable terminating with a mini plug. The mini plug inserts into one end of the light bar. The cable is a preset length as decided by the factory, usually in 4-, 6-, or 12-foot precut sections. The cable may include an on/off power switch, or the power switch may be located on the light bar.

SUMMARY OF THE INVENTION

The present invention in a preferred embodiment is directed to an undercabinet lighting kit for installation by an end user. The kit includes a plurality of light bars, each light bar including a housing having an elongated length with a first end and a second end, a lens covering at least a portion of the housing, an LED strip disposed within the housing along the elongated length having a plurality of LEDs emitting light through the lens, a first electrical connector disposed at the housing first end enclosed by an access cover, wherein the electrical connector includes a receiving hole and a biased clamp wired to the LED strip, and a second electrical connector disposed at the housing second end enclosed by an access cover, wherein the electrical connector includes a receiving hole and a biased clamp wired to the LED strip. The kit includes a control box with electronics operating as a power switch, a dimmer, and/or an IR proximity sensor. The control box has an AC adapter including a transformer and an AC/DC rectifier to receive and convert incoming AC power to output DC power to the control box. The kit is supplied with a spool of electrical cable that is cut by the end user to the desired lengths or electrical cable segments. The spool of electrical cabling includes a three-wire core. The ends of the three-wire core are stripped of insultation and inserted into one end of the light bar or the control box. Thus, the plurality of light bars are interconnected with the control box via the electrical cable segments.

The light bars and control box include electrical connectors for easy push and lock connection with the cable segments. A mechanical release mechanism allows the user to detach the cable segments as well. In accordance with one embodiment, the kit can include many light bars (maybe 10 or more) with a control box and power supply. Additional light bars can be purchased separately and can later be added to the existing system. The light bars and control box can be wired in series together as with railroad boxcars. The number of light bars in the system is only limited by the LED power consumption, the cable's current carrying capacity, and the power transformer output. In a system using many light bars, a junction box may be is used for the confluence point of the electrical cable segments and the power supply.

The kit includes, preferably, a spool of cabling that carries a three-wire core. The cabling is cut to the desired lengths by the end user. Two of the wires conduct the DC power while the third wire conducts a control signal for different functions for the light bars. For example, because the system operates from digital electronics, each light bar may have its own power switch with an optional dimming function. The control box may have any combination of an IR (infrared) motion sensor for detecting user proximity, a timer to switch off the light bars, and a power switch. The electronics inside the control box may include a memory function that recalls the last dimming setting or timer setting. Individual light bars may have LEDs with their own light spectrum output color, such as neutral white, warmer or cooler. The end user may thus mix and match warmer or cooler light bars.

BRIEF DESCRIPTION OF THE DRAWINGS

FIG. 4(a) shows one end of a light bar with the electrical wire connector holes and a pushbutton on/off switch. FIG. 4(b) shows one end of a light bar with a three-wire cable connected thereto.

DETAILED DESCRIPTION OF THE PREFERRED EMBODIMENTS

The present invention in a preferred embodiment is directed to a low voltage LED undercabinet or task light bar that includes electrical cabling that is offered to the consumer in a spool and can be cut to a custom length. The LED light bar includes electrical press fittings to receive the bare wire of the electrical cabling. Once the consumer or electrician cuts the cabling to the desired, customized length, he strips the cable of the insulation covering leaving the bare wires, which he then inserts into electrically conductive press fittings inside the light bar to complete the electrical connection. The preferred embodiment uses 20-22 gage solid core cabling that is good for up to 48 Watts and is commonly used in the industry, and such wire has sufficient stiffness and column strength so that the bare end can be pushed into the fitting without buckling or kinking. Once pushed in, the electrical fitting has friction or spring-biased grippers that do not allow the bare end to pull out and detach. Thus, the consumer with simple household tools can install the present invention light bar kit and cut the cabling to a custom length suitable for that application.

Figure 1C:
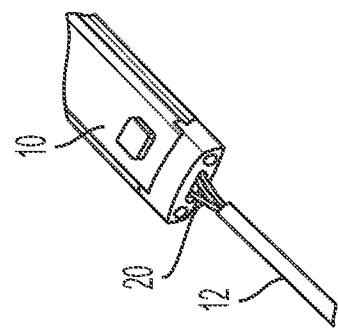
FIG. 1(c) shows a three-wire cable inserted into one end of a light bar.
Figure 1A:
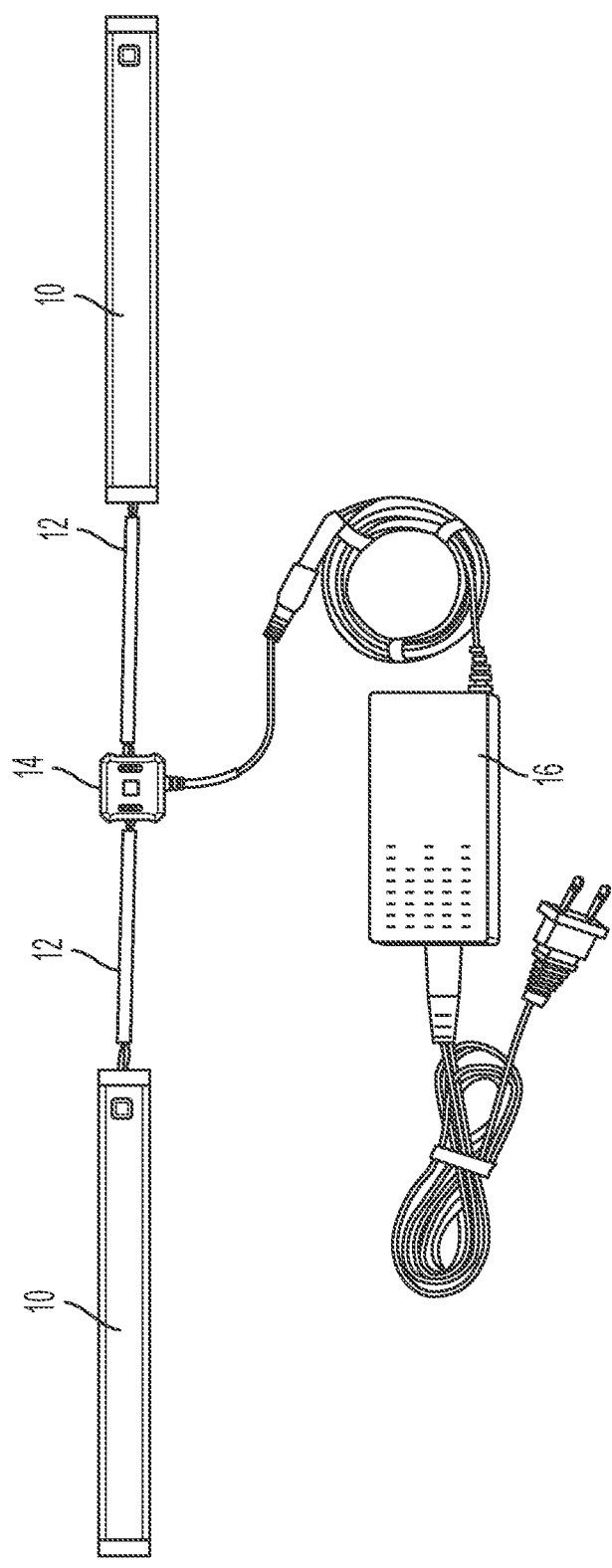
FIG. 1(a) shows a preferred embodiment undercabinet LED light kit wired up and ready for mounting.
Figure 2:
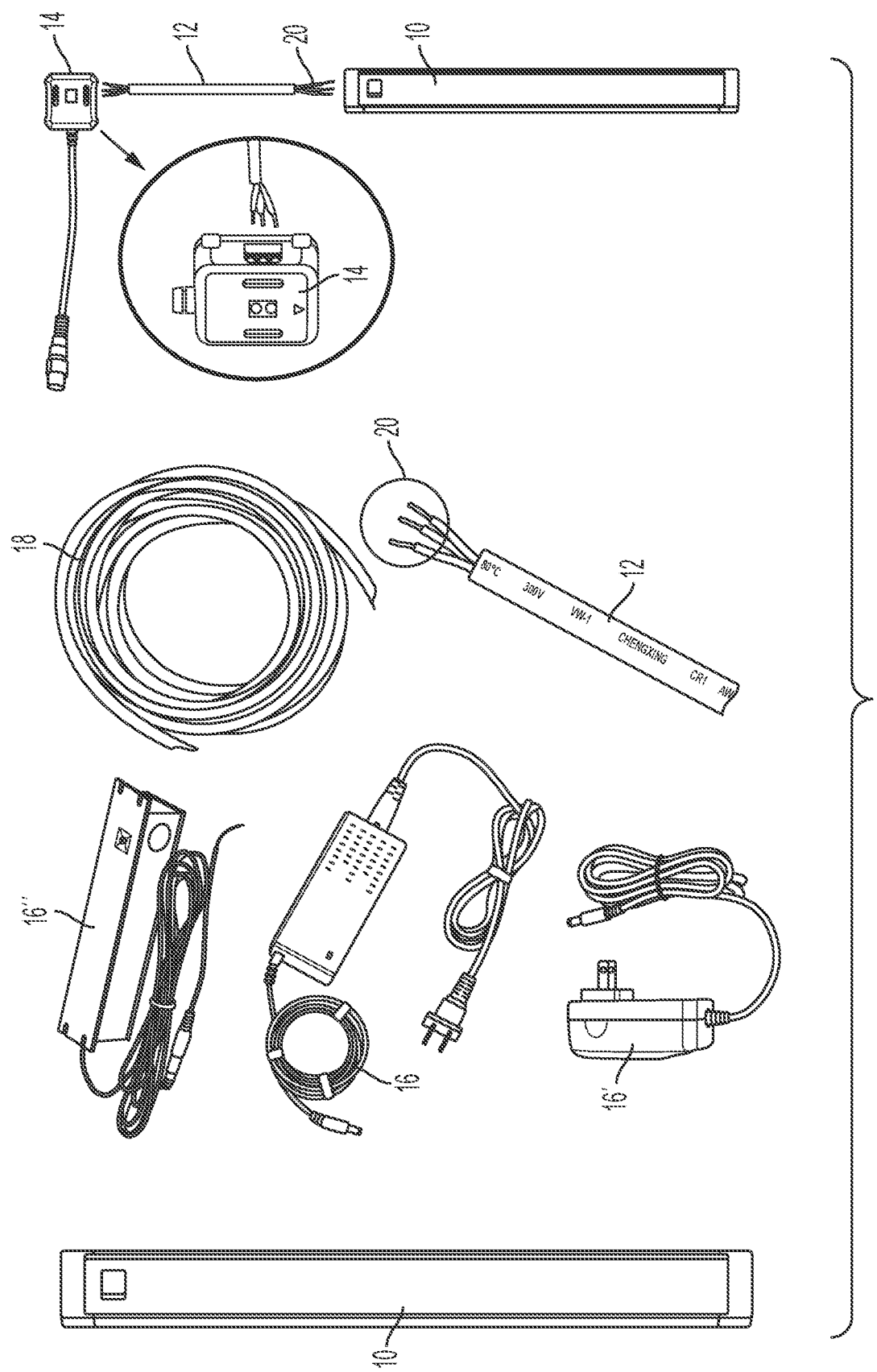
FIG. 2 shows some of the typical components of a preferred embodiment kit.

FIG. 1(a) shows a preferred embodiment first light bar 10 connected to a control box 14 connected to a second light bar 10. The three components are preferably connected in series as shown. The control box 14 is powered by a transformer 16 including an internal AC-to-DC rectifier. The transformer 16 has preferably a duty rating of 48 W or 60 W, and has a plug that fits into any common 120V AC wall outlet found in the United States, but may be adapted to European or Asian electrical standards as the market requires. The transformer 16 steps down voltage from 120V AC to, typically, 12V/24V DC to drive the digital electronics in the control box 14 and the LEDs inside the light bar 10. The transformer 16 "brick" may also hold the LED driver inside. Other configurations for the transformer are shown in FIG. 2 include transformer 16, integrated plug transformer 16', and high capacity transformer 16" used with a junction box when many, many light bars are wired together in one system. So in FIG. 1(a), there is an 120 VAC from the plug to the transformer 16, which outputs 12/24 VDC to the control box 14. The control box 14 then feeds 12/24 VDC to the two light bars 10. In an alternative embodiment, there may be more than one control box 14 used per system, but that is not necessary.

The second light bar 10 is shown in FIG. 1(a) wired in series with the control box 14 and the first light bar, such as with railroad box cars. More and more light bars, optionally up to several dozen, may be added by the user to the open-connector ends of the two light bars shown in FIG. 1(a)

FIG. 2 shows some of the typical contents of a kit and assembling the system for installation. The electrical cable segments 12 are preferably supplied in the kit initially in the form of a coiled spool 18 of uncut cabling. The end user or electrician then chooses the desired lengths and cuts the individual cable segments 12. The customized lengths of the cable segments 12 allow the light bars 10 to be positioned in a customized configuration that matches the individual's workstation or office lighting needs.

The cable from the spool 18 is preferably low voltage 12/24 VDC, at 20 or 22 AWG gage size, bundling three discrete solid core wires 20 shown in FIG. 2. The spool 18 preferably carries uncut cabling in 10-feet, 25-feet, or 100-feet lengths. Other lengths are contemplated, of course. Two of the three wires 20 supply DC power to the light bars 10 while the third wire contains a control signal from the control box 14 to control the dimming, on/off, or auto shutoff timer functions for the light bars 10 wired together. The three wires 20 may be color coded; usually the center wire contains the control signal. The leads of the three wires 20, once stripped of insulation, are pushed into the electrical connectors or receptacles found at the opposite ends of the light bar 10 or the control box 14.

Figure 3:
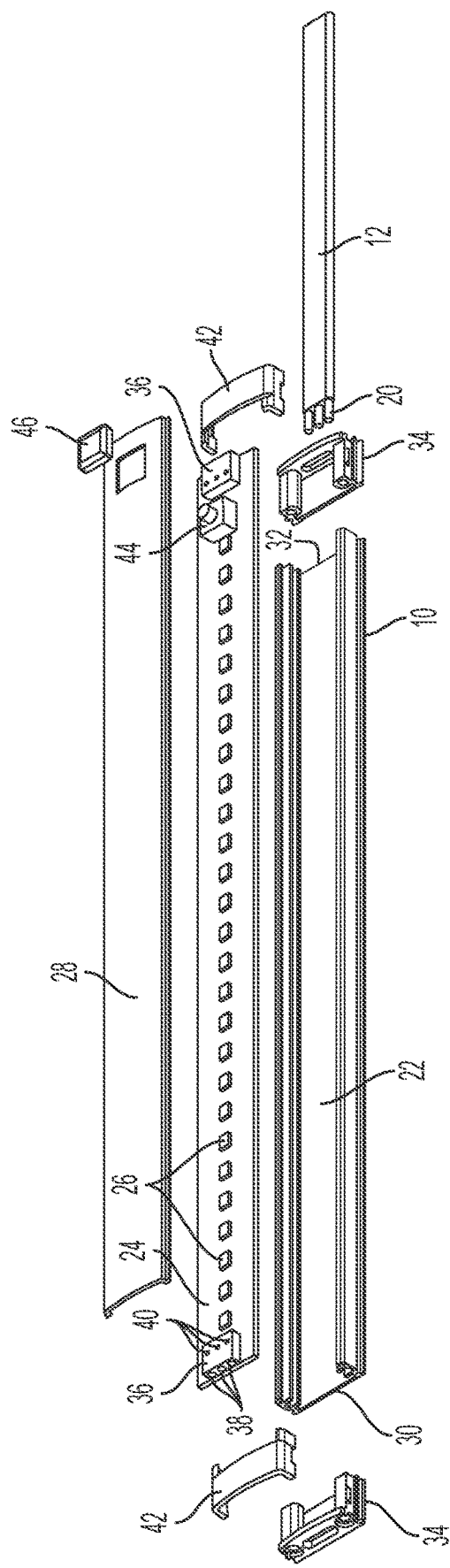
FIG. 3 is an exploded view of a preferred embodiment LED light bar.
Figure 5:
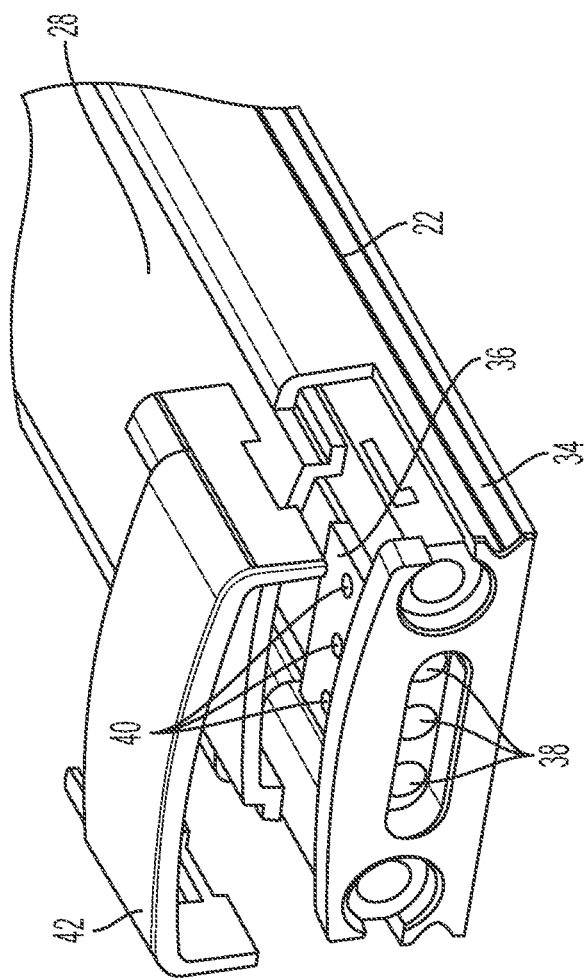
FIG. 5 is a magnified view of a wire connector inside one end of the light bar with the cover detached.

FIG. 3 is an exploded view of a preferred embodiment light bar 10. The light bar 10 includes an elongated housing 22 made of metal or plastic. A long, electrically conductive strip or substrate 24 has a plurality of LEDs 26 mounted thereon. Different color LEDs may be installed for different color spectrum lighting (i.e., correlated color temperature or CCT), meaning one light bar may emit a warmer color spectrum light while another light bar might emit a cooler color spectrum light, or anything in between such as neutral white light. As such, the end user may choose individual light bars or an entire kit with LEDs that emit the desired color temperature. In various preferred embodiments, a single light bar may emit a CCT color temperature of white light at 4000 deg. K or a warmer light at 2700 deg. K. The collective light output of the LEDs is over 300 lumens while consuming 4 W. That brightness is more than adequate to light up the work area of a 36-inch cabinet or workstation.

An optional translucent lens, diffuser, and/or reflector 28 covers the LED strip 24 enclosing it inside the housing 22. At each opposite end 30, 32 of the housing 22 is an electrical connector 34, 36. The electrical connector 36 includes three holes 38 that receive the three wires 20 of cable segment 12. Inside the electrical connector holes 38 is a mechanism for retaining the wires 20 therein, preferably by spring bias or force that urges a clip into engaging the wire 20. A frictional engagement between the wires 20 and the connector is also contemplated. The retained wires 20 are clamped with sufficient force that they cannot be easily pulled out of those holes 38. The solid core wires 20 have sufficient column strength so they can be pushed into the receiving holes 38 under finger pressure, so no tools are required. There are three release holes 40 located at the top of the connector 36 that allow the user to counter the bias of the clip against the wires 20 so that they can be unclamped and pulled out and detached from the connector 36. The electrical connector 36 at both ends 30, 32 of the light bar are electrically wired to the strip 24 and in turn to the LEDs 26. There is an optional access cover 42 that snaps in place on the housing 22 to cover each electrical connector 34, 36. The cover 42 is removable to allow a pin, paper clip, or screwdriver access to the release holes 40 underneath.

The disclosed electrical connector 34, 36 may be purchased off-the-shelf. It is commonly known in the art as a WAGO electrical connector or terminal. The WAGO electrical connector is disclosed in, e.g., German Published App. No. DE 10 2013 101 830 B4 (Endmann), the contents of which are hereby incorporated by reference.

The preferred embodiment light bar 10 is rated for 4 W at 24 VDC, and is used for a class 2 power source. The light bar 10 has preferred proportions of about 10 inches in length, about 0.75 inch width, and a thickness of about 0.25 inch. Other dimensions and proportions are contemplated. The elongated housing 22 is fashioned from a thin sheet of metal such as aluminum or steel. The housing 22 or kit may include mounting means such as hooks, eyelets, clips, magnets, Velcro, threaded holes, screw fasteners, or the like, for mounting to a cabinet, hutch, bookshelf, partition, wall, etc. Double stick tape or Velcro adhesive tape is preferred and sufficient for mounting the light bar 10, because the light bar is very small and is very, very light in weight.

As seen in FIG. 3, each light bar 10 may include its own switch 44, wired to the strip 24, that protrudes through the lens 28. It is optionally covered and operated by a pushbutton 46. The switch 44 is preferably an on/off switch, but may include a dimming function when held down to dim the light output of the LEDs 26. Further, the digital electronics inside the switch 44 may include a memory that retains the previously user-set dimming level. Thus, the end user may power on/off or dim all of the light bars conveniently from the light bar closest to him or her.

FIG. 4(a) shows a housing end 30, 32 of the light bar 10 where the three insertion holes 38 are visible. FIG. 4(b)

shows the three wires 20 of the electrical cable segment 12 inserted into the electrical connector 34 as described above.

Figure 7:
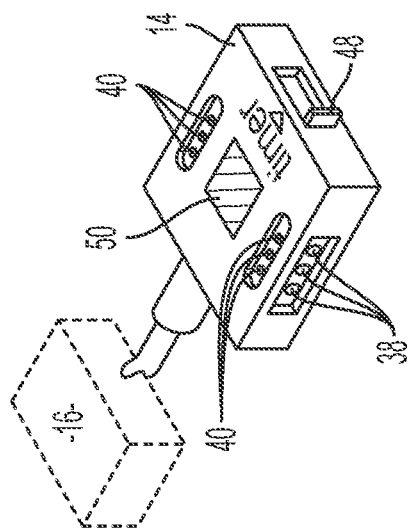
FIG. 7 is a perspective view of a preferred embodiment control box.

FIG. 7 is a perspective view of a preferred embodiment control box 14. The control box 14 should ideally be mounted closest to the user for ready access. It is preferably a square shape, and on two opposite edge faces are preferably WAGO electrical connectors with three holes 38 to receive the three wire leads 20 as described above. On top of the control box 14 are the three wire release holes 40. An optional timer slide switch 48 is seen on another edge face of the control box 14. The slide switch 48 may set how long the light bars will turn off when no motion is detected by the IR sensor 50, or may switch on or off the auto shutoff timer function that is factory set at, say, several hours. The construction of the IR sensor and timer incorporate known, off-the-shelf digital electronics.

Figure 1B:
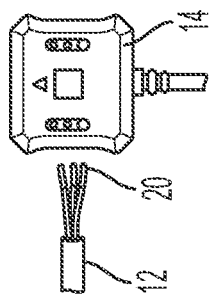
FIG. 1(b) is a magnified view of a preferred embodiment control box.
Figure 6C:
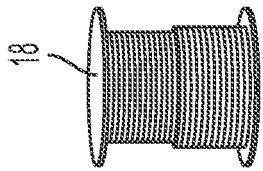
FIG. 6(c) depicts a spool of uncut cabling.
Figure 6B:
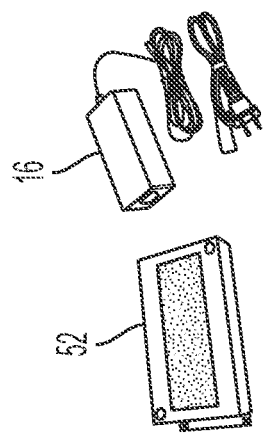
FIG. 6(b) shows an optional junction box and an AC adapter to power the kit.
Figure 6A:
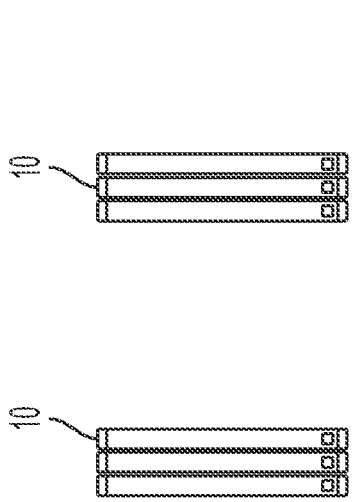
FIG. 6(a) represents kits with a 10-pack of light bars of different color temperatures.

FIGS. 6(*a*), 6(*b*), and 6(*c*) show alternative embodiment kit configurations. FIG. 6(*a*) shows a kit may contain a 10-pack of light bars 10 of warmer color lights, or a 10-pack of cooler color light bars. FIG. 6(*b*) shows a 48 W direct wire junction box 52 for connecting up to 10 light bars. A Romex cable (not shown) carrying 120/220 high voltage is connected to the direct wire junction box 52, and the junction box 52 splits the output to the 12/24V low voltage cabling extending out the other side. The low voltage cabling coming out of the junction box 52 can be arranged in parallel to directly plug into a half dozen or so light bars. Or the low voltage cabling can be directly plugged into the six light bars wired in series. The junction box 52 may include any combination of a transformer/rectifier, LED drivers, and a power wall plug. FIG. 6(*b*) also shows a 48 W adapter 16 for powering up to 10 light bars similar to the transformer brick 16 shown in FIG. 1(*a*). FIG. 6(*c*) shows an uncut 100-foot long spool 18 of three-wire electrical cable.

With the preferred embodiment kit, low voltage wire is directly connected to the light bars. The kit thus contains light bars that have no excess cabling that is unsightly and bulky, or that can be tangled or twisted. If the power supply is distant from the actual location of the light bar installation site, the end user simply cuts a longer length of cable to connect the outlet to the light bars. When retailers stock inventory, there is no need to carry light bars with cables of many different fixed lengths (with many SKUs), because the consumer can cut the length of the cable as needed in the field. The consumer can also pick and choose individual light bars or kits directed to different color temperatures to match the specific lighting requirements. More individual light bars may be purchased at a later date and then added to the pre-existing light bar system from the original kit.

While the particular preferred embodiments of the invention have been illustrated and described, it will be apparent that various modifications can be made without departing from the spirit and scope of the invention. It is contemplated that elements from one embodiment may be combined or substituted with elements from another embodiment.

What is claimed is:

1. An undercabinet lighting kit for installation by an end user, comprising:
   a first light bar including a housing having an elongated length with a first end and a second end, and a lens covering at least a portion of the housing;
   an LED strip disposed within the housing along the elongated length having a plurality of LEDs emitting light through the lens;
   a first electrical connector disposed at the housing first end enclosed by an access cover, wherein the electrical connector includes a receiving hole and a biased clamp, and is wired to the LED strip;
   a second electrical connector disposed at the housing second end enclosed by an access cover, wherein the electrical connector includes a receiving hole and a biased clamp, and is wired to the LED strip;
   a control box including electronics operating as at least one of a power switch, a dimmer, and a IR proximity sensor;
   an AC adapter including a transformer and an AC/DC rectifier to receive and convert incoming AC power to output DC power to the control box; and
   at least one electrical cable segment for conducting DC power, the cable segment including a three-wire core, electrically interconnecting the light bar and the control box, and wherein the three-wire core is inserted into at least one of the first and second electrical connectors.

2. The undercabinet lighting kit of claim 1, wherein the light bar includes a pushbutton for controlling at least one of power and dimming.

3. The undercabinet lighting kit of claim 1, wherein the electrical cable segment is cut from a spool of coiled cabling.

4. The undercabinet lighting kit of claim 3, wherein the kit further includes a second light bar that is connected to at least one of the control box and the first light bar via another electrical cable segment cut from the spool.

5. The undercabinet lighting kit of claim 4, wherein the kit further includes a third light bar that is connected to at least one of the control box and the second light bar via another electrical cable segment cut from the spool.

6. The undercabinet lighting kit of claim 1, wherein the LEDs of the light bar include at least one of warmer and cooler light output spectrum temperatures.

7. The undercabinet lighting kit of claim 1, wherein the three-wire core of the electrical cable segment includes two wires conducting DC power and one wire conducting a control signal.

8. The undercabinet lighting kit of claim 1, wherein the transformer includes a duty rating of 48 W to 60 W.

9. The undercabinet lighting kit of claim 4, wherein the first light bar, the second light bar, and the control box are connected in series.

10. An undercabinet lighting kit for installation by an end user, comprising:
    a first light bar including a housing having an elongated length with a first end and a second end, and a lens covering at least a portion of the housing;
    an LED strip disposed within the housing along the elongated length having a plurality of LEDs emitting light through the lens;
    a first electrical connector disposed at the housing first end enclosed by an access cover, wherein the electrical connector includes a receiving hole and a biased clamp, wired to the LED strip;
    a second electrical connector disposed at the housing second end enclosed by an access cover, wherein the electrical connector includes a receiving hole and a biased clamp, wired to the LED strip;
    a second light bar including a housing having an elongated length with a first end and a second end, and a lens covering at least a portion of the housing;
    an LED strip disposed within the housing along the elongated length having a plurality of LEDs emitting light through the lens;
    a first electrical connector disposed at the housing first end enclosed by an access cover, wherein the electrical connector includes a receiving hole and a biased clamp, wired to the LED strip;

a second electrical connector disposed at the housing second end enclosed by an access cover, wherein the electrical connector includes a receiving hole and a biased clamp, wired to the LED strip;

a control box including electronics that function as at least one of a power switch, a dimmer, and a IR proximity sensor;

an AC adapter including a transformer and an AC/DC rectifier to receive and convert incoming AC power to output DC power to the control box;

at least one electrical cable segment for conducting DC power, wherein the at least one electrical cable segment includes a three-wire core; and wherein the first light bar, the second light bar, and the control box are connected in series via the at least one electrical cable segment.

11. The undercabinet lighting kit of claim 10, wherein the kit includes a spool of electrical cable that is cut into discrete electrical cable segments by the end user.

12. The undercabinet lighting kit of claim 10, wherein the first light bar and the second light bar each includes a power/dimmer button integrated into the light bar.

13. The undercabinet lighting kit of claim 10, wherein the three-wire core electrical segment includes two wires conducting DC power and one wire conducting a control signal.

14. The undercabinet lighting kit of claim 10, wherein the control box includes a square shape with at least one connector for receiving the at least one electrical cable segment, an IR detector, and an auto shutoff timer.

15. An undercabinet lighting kit for installation by an end user, comprising:

a plurality of light bars, each light bar including a housing having an elongated length with a first end and a second end, a lens covering at least a portion of the housing, an LED strip disposed within the housing along the elongated length having a plurality of LEDs emitting light through the lens, a first electrical connector disposed at the housing first end enclosed by an access cover, wherein the electrical connector includes a receiving hole and a biased clamp wired to the LED strip, and a second electrical connector disposed at the housing second end enclosed by an access cover, wherein the electrical connector includes a receiving hole and a biased clamp wired to the LED strip;

a control box including electronics operating as at least one of a power switch, a dimmer, and a IR proximity sensor;

an AC adapter including a transformer and an AC/DC rectifier to receive and convert incoming AC power to output DC power to the control box;

a plurality of electrical cable segments cut from a spool, each cable segment including a three-wire core; and wherein the plurality of light bars are connected with the control box via the electrical cable segments.

16. The undercabinet lighting kit of claim 15, wherein at least one light bar includes a power/dimmer button integrated into the housing.

17. The undercabinet lighting kit of claim 15, wherein the LEDs emit at least one of a preselected warmer and cooler CCT color temperature.

18. The undercabinet lighting kit of claim 15, wherein the spool of electrical cable includes an uncut length of about 10 feet to 100 feet.

19. The undercabinet lighting kit of claim 15, wherein the kit includes means for mounting the plurality of light bars.

20. The undercabinet lighting kit of claim 15, wherein the kit includes a junction box for receiving a plurality of electrical cable segments.

* * * * *